United States Patent
Gardner et al.

(10) Patent No.: US 11,290,291 B2
(45) Date of Patent: Mar. 29, 2022

(54) POWER OVER DATA LINES SYSTEM WITH COMBINED DC COUPLING AND COMMON MODE TERMINATION CIRCUITRY

(71) Applicant: Analog Devices International Unlimited Company, Limerick (IE)

(72) Inventors: Andrew Gardner, Santa Barbara, CA (US); Gitesh Bhagwat, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 524 days.

(21) Appl. No.: 16/406,889

(22) Filed: May 8, 2019

(65) Prior Publication Data
US 2020/0044875 A1    Feb. 6, 2020

Related U.S. Application Data

(60) Provisional application No. 62/712,762, filed on Jul. 31, 2018.

(51) Int. Cl.
*H04L 12/10* (2006.01)
*H04L 25/02* (2006.01)

(52) U.S. Cl.
CPC .......... *H04L 12/10* (2013.01); *H04L 25/0276* (2013.01); *H04L 25/0298* (2013.01)

(58) Field of Classification Search
CPC ..... H04L 12/10; H04L 25/02; H04L 25/0276; H04L 25/0298; H04L 25/0266; H04L 25/0272; H04B 3/54; H04B 3/548; H04B 3/56
See application file for complete search history.

(56) References Cited

U.S. PATENT DOCUMENTS

| | | | | |
|---|---|---|---|---|
| 5,986,539 | A * | 11/1999 | Johansson | H04B 3/548 307/106 |
| 6,459,739 | B1 * | 10/2002 | Vitenberg | H04B 3/30 333/12 |
| 6,492,880 | B1 * | 12/2002 | Chiappe | H04L 25/0266 333/22 R |
| 6,804,304 | B1 * | 10/2004 | Chan | H04L 12/10 375/222 |
| 7,200,176 | B1 * | 4/2007 | Paulos | H04L 25/0266 375/257 |
| 7,474,704 | B2 * | 1/2009 | Lum | H04L 12/10 375/257 |

(Continued)

*Primary Examiner* — James M Perez
(74) *Attorney, Agent, or Firm* — Schwegman Lundberg & Woessner, P.A.

(57) ABSTRACT

In a Power over Data Lines (PoDL) system that conducts differential data and DC power over the same wire pair, various DC coupling techniques are described that improve DC voltage coupling while attenuating AC common mode noise and avoiding mode conversion. A first CMC and AC coupling capacitors are connected in series between a PHY and a twisted wire pair. A DC power supply is DC coupled to the wires via a series connection of a DMC and either matched inductors or a second CMC. Coupled between the DMC and the inductors/CMC is an RC termination circuit comprising a first capacitor coupled to one leg and a matched second capacitor coupled to the other leg. The two capacitors are connected to the same resistor coupled to ground.

20 Claims, 4 Drawing Sheets

(56) References Cited

U.S. PATENT DOCUMENTS

| | | | | |
|---|---|---|---|---|
| 7,711,967 B2* | 5/2010 | Woo | | G06F 1/266 |
| | | | | 713/300 |
| 8,472,532 B2* | 6/2013 | Schley-May | | H04B 1/10 |
| | | | | 375/258 |
| 8,582,271 B2* | 11/2013 | Bertin | | G06F 1/26 |
| | | | | 361/111 |
| 8,928,425 B1* | 1/2015 | Sedarat | | H04B 3/30 |
| | | | | 333/12 |
| 8,929,468 B1* | 1/2015 | Voigt | | H04B 3/42 |
| | | | | 375/258 |
| 9,379,785 B2* | 6/2016 | Shameli | | H04B 5/02 |
| 9,385,790 B1* | 7/2016 | Mukherjee | | H04B 5/0087 |
| 9,588,564 B2* | 3/2017 | Buckmeier | | G06F 1/266 |
| 9,590,695 B1* | 3/2017 | Sedarat | | H04B 3/32 |
| 9,602,317 B1* | 3/2017 | Hailu | | H03F 3/45183 |
| 10,067,165 B2* | 9/2018 | Chen | | G01R 29/26 |
| 10,135,626 B2 | 11/2018 | Pischl | | H04L 12/10 |
| 10,148,447 B1* | 12/2018 | Rajagopal | | H04L 12/10 |
| 10,205,539 B2* | 2/2019 | Chini | | H04B 15/005 |
| 10,333,742 B1* | 6/2019 | Bhagwat | | H04L 25/0276 |
| 10,382,005 B2* | 8/2019 | Gardner | | H04L 25/0298 |
| 10,382,216 B1* | 8/2019 | Bhagwat | | H04L 12/10 |
| 10,404,502 B2* | 9/2019 | Gardner | | H04B 3/30 |
| 10,425,237 B1* | 9/2019 | Bhagwat | | H04L 12/10 |
| 10,444,823 B2* | 10/2019 | Gardner | | H04L 12/10 |
| 10,581,643 B1* | 3/2020 | Rajagopal | | H04L 25/0266 |
| 10,587,424 B1* | 3/2020 | Bhagwat | | H02J 1/00 |
| 10,594,363 B2* | 3/2020 | Pandey | | H01F 19/04 |
| 10,594,367 B1* | 3/2020 | Bhagwat | | H04L 12/40045 |
| 10,594,519 B2* | 3/2020 | Bhagwat | | H04L 12/40045 |
| 10,649,945 B1* | 5/2020 | Geerling | | G06F 13/4068 |
| 10,652,035 B1* | 5/2020 | Bhagwat | | H01F 27/28 |
| 10,652,050 B2* | 5/2020 | Bhagwat | | H04L 12/10 |
| 10,763,919 B1* | 9/2020 | Gardner | | H04B 3/548 |
| 10,914,789 B2* | 2/2021 | Lemkin | | H04Q 9/04 |
| 11,038,490 B2* | 6/2021 | Gardner | | H03H 11/50 |
| 2004/0017689 A1* | 1/2004 | Zhang | | H02M 7/493 |
| | | | | 363/71 |
| 2004/0239465 A1* | 12/2004 | Chen | | H01F 17/00 |
| | | | | 336/173 |
| 2004/0257743 A1* | 12/2004 | Chen | | H04L 25/0266 |
| | | | | 361/119 |
| 2005/0219006 A1* | 10/2005 | Suenaga | | H04L 25/0272 |
| | | | | 333/12 |
| 2006/0061304 A1* | 3/2006 | Cho | | H05B 41/2822 |
| | | | | 315/307 |
| 2007/0025452 A1* | 2/2007 | Schindler | | H04B 3/44 |
| | | | | 375/257 |
| 2007/0071112 A1* | 3/2007 | Gattani | | H04L 25/0272 |
| | | | | 375/257 |
| 2007/0077819 A1* | 4/2007 | Thomson | | H04L 12/10 |
| | | | | 439/620.01 |
| 2007/0087722 A1* | 4/2007 | Ichihara | | H04B 3/54 |
| | | | | 455/343.1 |
| 2007/0153920 A1* | 7/2007 | Proebsting | | H04L 25/0272 |
| | | | | 375/257 |
| 2007/0236853 A1* | 10/2007 | Crawley | | H04L 12/10 |
| | | | | 361/119 |
| 2008/0051158 A1* | 2/2008 | Male | | H04L 25/0278 |
| | | | | 455/572 |
| 2008/0080105 A1* | 4/2008 | Blaha | | H04L 12/10 |
| | | | | 361/38 |
| 2008/0267212 A1* | 10/2008 | Crawley | | H05K 9/0066 |
| | | | | 370/463 |
| 2008/0267301 A1* | 10/2008 | Alfano | | H01L 23/66 |
| | | | | 375/258 |
| 2010/0033165 A1* | 2/2010 | Rostamzadeh | | G01R 31/001 |
| | | | | 324/127 |
| 2010/0218003 A1* | 8/2010 | Blaha | | H04L 25/02 |
| | | | | 713/300 |
| 2011/0130163 A1* | 6/2011 | Saban | | H04W 88/085 |
| | | | | 455/517 |
| 2011/0217873 A1* | 9/2011 | Diab | | H01R 13/66 |
| | | | | 439/620.01 |
| 2011/0243254 A1* | 10/2011 | Pischl | | H04L 25/0276 |
| | | | | 375/257 |
| 2012/0177133 A1* | 7/2012 | Oldenkamp | | H04B 3/54 |
| | | | | 375/257 |
| 2013/0262884 A1* | 10/2013 | Yu | | H04L 12/40045 |
| | | | | 713/300 |
| 2013/0286864 A1* | 10/2013 | Karam | | G01R 19/16566 |
| | | | | 370/252 |
| 2014/0037077 A1* | 2/2014 | Marchetti | | H04B 3/56 |
| | | | | 379/93.06 |
| 2014/0092724 A1* | 4/2014 | Lontka | | H04L 25/0266 |
| | | | | 370/221 |
| 2014/0136874 A1* | 5/2014 | Diab | | H04L 12/40045 |
| | | | | 713/340 |
| 2014/0139014 A1* | 5/2014 | Sontag | | H04L 12/10 |
| | | | | 307/1 |
| 2015/0029902 A1* | 1/2015 | Tischler | | H04L 25/0272 |
| | | | | 370/276 |
| 2015/0333935 A1* | 11/2015 | Gardner | | H02M 3/158 |
| | | | | 307/1 |
| 2016/0054777 A1* | 2/2016 | Dwelley | | G06F 1/3206 |
| | | | | 710/110 |
| 2016/0064924 A1* | 3/2016 | Wiese | | H04L 12/10 |
| | | | | 361/119 |
| 2016/0187951 A1* | 6/2016 | Buckmeier | | H04L 12/10 |
| | | | | 713/300 |
| 2016/0308683 A1* | 10/2016 | Pischl | | H04L 12/10 |
| 2017/0178783 A1* | 6/2017 | Lou | | H01F 27/24 |
| 2017/0187472 A1* | 6/2017 | Chini | | H04B 3/50 |
| 2017/0194928 A1* | 7/2017 | Xu | | H03H 7/427 |
| 2017/0301455 A1* | 10/2017 | Kobayashi | | H01F 17/045 |
| 2018/0024620 A1* | 1/2018 | Gardner | | G06F 1/3287 |
| | | | | 713/323 |
| 2018/0026525 A1* | 1/2018 | Gardner | | H04L 25/0298 |
| | | | | 333/181 |
| 2018/0109041 A1* | 4/2018 | Ramsey | | H03H 7/427 |
| 2018/0145630 A1* | 5/2018 | Zhang | | H03B 7/06 |
| 2018/0254931 A1* | 9/2018 | Gardner | | H04L 25/0266 |
| 2019/0068385 A1* | 2/2019 | Gardner | | H02J 3/02 |
| 2019/0199400 A1* | 6/2019 | Pandey | | H04B 3/04 |
| 2019/0199401 A1* | 6/2019 | Pandey | | H04L 27/2647 |
| 2019/0253284 A1* | 8/2019 | Jalali Far | | H03H 7/38 |
| 2019/0288862 A1* | 9/2019 | Bhagwat | | H04L 12/10 |
| 2019/0329666 A1* | 10/2019 | Kodama | | H02J 7/00 |
| 2019/0342123 A1* | 11/2019 | Bhagwat | | H04B 3/56 |
| 2019/0342124 A1* | 11/2019 | Bhagwat | | H04L 12/40045 |
| 2020/0044875 A1* | 2/2020 | Gardner | | H04L 25/0276 |
| 2020/0145237 A1* | 5/2020 | Bhagwat | | H02J 1/06 |
| 2020/0204399 A1* | 6/2020 | Crayford | | H01R 24/64 |
| 2020/0266854 A1* | 8/2020 | Gardner | | H04B 3/548 |
| 2020/0304106 A1* | 9/2020 | Gardner | | H04L 12/10 |
| 2020/0402706 A1* | 12/2020 | Igarashi | | H01F 27/2804 |
| 2021/0036897 A1* | 2/2021 | Gardner | | H04L 12/40045 |
| 2021/0352376 A1* | 11/2021 | Huang | | H04N 21/6118 |

\* cited by examiner

POWER OVER DATA LINES SYSTEM WITH COMBINED DC COUPLING AND COMMON MODE TERMINATION CIRCUITRY

CROSS-REFERENCE TO RELATED APPLICATIONS

This application is based on and claims priority from U.S. Provisional Application Ser. No. 62/712,762, filed Jul. 31, 2018, by Andrew Gardner et al., incorporated herein by reference.

FIELD OF THE INVENTION

The invention relates to Power over Data Lines (PoDL) systems, where DC power and differential data are provided over the same twisted wire pair, and, in particular, to techniques for providing DC power to the wire pair, improving the attenuation of common mode noise, and reducing common mode to differential mode conversion.

BACKGROUND

The US patent application publications 2018/0026525 and 2018/0024620, assigned to the present assignee, describe various configurations of PoDL systems that use combinations of CMCs and differential mode chokes (DMCs) to attenuate common mode noise while providing DC power to a twisted wire pair.

U.S. Pat. No. 10,205,539, incorporated herein by reference, also discloses various PoDL configurations. The present application relates to improving the circuitry disclosed in U.S. Pat. No. 10,205,539.

FIG. 1 is generally reproduced from U.S. Pat. No. 10,205,539 and shows a PoDL circuit that attenuates common mode noise, couples a DC voltage to the wire pair 210, and terminates the wire pair 210 with a "matched impedance" termination circuit 404 to prevent reflections of common mode noise on the wire pair 210.

In FIG. 1, a physical layer device (PHY) 206a receives data from a Medium Access Control (MAC) controller in the form of Ethernet Media Independent Interface (MII) data 212a. The PHY 206 then preforms conventional data conversion to generate differential serial bits at its output. The PHY 206a also receives differential Ethernet data. The PHY 206a represents the physical layer in the OSI model and is a transceiver that typically includes signal conditioning and decoding circuitry for presenting bits to the next stage. The term PHY is a term of art and is defined by various IEEE standards, depending on the particular application. The PHY 206a is typically an integrated circuit. A digital processor (not shown) is coupled to the PHY 206a for processing the data.

The PHY 206a is connected to a Media Dependent Interface (MDI) connector 208a via a common mode choke (CMC) 402 and AC coupling capacitors C3 and C4. The CMC 402 blocks common mode noise output by the PHY 206a and blocks common mode noise from being received by the PHY 206a. The CMC 402 is an in-line transformer with two windings, where each winding is in series with a wire in the twisted wire pair. As shown by the dots on the CMC 402 windings, the windings have the same polarity, so the magnetic fields generated by a differential mode signal are substantially cancelled out. Thus, the CMC 402 presents little inductance or impedance to differential-mode currents. Common mode currents due to noise, however, see a high impedance due to the combined inductances of the windings.

The CMC 402 ideally eliminates or greatly attenuates common mode noise while providing low loss for the differential signals.

A differential mode choke (DMC) 410 is coupled between the MDI 208a and a combination of termination circuitry 404 and a DC power supply (supplying the voltage $V_S$). The DC power portion of the circuit is identified as the PoDL circuit 408.

The DMC 410 has windings with opposite polarities (dots on opposite ends). The DMC 410 presents a high impedance to AC differential mode signals while it shunts the common mode signals to the power supply (connected across the Vs and ground terminals) and to the termination circuitry 404 due to its low impedance to common mode signals. Therefore, the combination of the CMC 402 attenuation and the DMC 410 shunting can have a substantial effect on AC common mode signals in the system.

It is important to match the termination circuitry for each wire to minimize common mode reflections and mode conversion (i.e., common mode to differential mode and vice versa).

FIG. 1 uses a single capacitor C2 to AC couple the DMC 410 leads connected to the voltage $V_S$ and the termination circuitry 404. Hence, the voltage across capacitor C2 is charged to approximately the power supply voltage for application of the DC voltage to the wire pair 210. The capacitor C2 presents a low impedance at the data signal frequencies.

The termination circuit 404, consisting of the capacitor C1, resistor R1, and inductor L1, is coupled to node 412 and is intended to absorb or dissipate any common mode noise power that is passed by the DMC 410. The inductor L1 results in a short to ground for DC current. The impedance of the termination circuit 404 is ideally matched to the common mode impedance of the wire pair 210 in the data signal bandwidth.

Although U.S. Pat. No. 10,205,539 stresses that the circuit of FIG. 1 reduces the likelihood of imbalances that cause mode conversion, the circuit still can be substantially improved.

FIG. 2 illustrates the circuit of FIG. 1 and further shows a DC power supply 212 coupled between the ground terminal and the Vs terminal. The power supply 212 has a low output impedance to ground, typical of a DC voltage source. Therefore, the power supply 212 may short out the common mode termination impedance, causing common mode noise to be reflected at the MDI 208a.

Another problem with the circuit of FIG. 2 is the different impedance between each of the wires in the wire pair 210 and the termination circuitry 404 due to the termination circuit 404 being directly coupled to the left lead of the DMC 410 while being coupled to the right lead of the DMC 410 by the capacitor C2. This imbalance (non-symmetry) may give rise to mode conversion at the MDI 208a.

What is needed is an improvement of the circuit of FIG. 2 where there is a reduced likelihood of mode conversion and an improved common mode termination while DC voltage is being applied at the leads of the DMC 410.

SUMMARY

A PoDL circuit includes a PHY connected to a twisted wire pair by a serially connected CMC and AC coupling capacitors.

Coupled to nodes between the AC coupling capacitors and the wire pair is a DMC in series with a pair of inductors or a second CMC. The pair of inductors (either separate or in the CMC) may be matched. A DC power supply is connected to the pair of inductors or the second CMC. The combination of the DMC and the inductors/second CMC pass DC voltage and current. The DMC passes common mode signals, and the CMC blocks common mode signals.

For matching the impedance of the wires for preventing reflections of common mode noise, a first capacitor is coupled to a first node between DMC and the pair of inductors/second CMC. The first capacitor is connected to ground via a resistor with a resistance that matches the common mode impedance of the twisted wire pair.

A second capacitor is coupled to a second node between the DMC and the pair of inductors/second CMC. The second capacitor is connected to ground via the same resistor or a different resistor. The capacitors may be matched. If the first and second capacitors are connected to different resistors, the resistors are matched. A single (shared) resistor is preferred to prevent imbalances due to resistor tolerances, unbalanced layout, etc.

Since the inductors/second CMC is between the power supply and the RC termination circuitry, the power supply impedance does not significantly affect the termination impedance.

Since each wire is now coupled in the exact same way to the termination circuitry and the power supply, the termination is balanced so there is minimal mode conversion, and common mode signals are not reflected.

BRIEF DESCRIPTION OF THE DRAWINGS

Elements labelled with the same numerals in the various drawings may be the same or equivalent.

DETAILED DESCRIPTION

Figure 1:
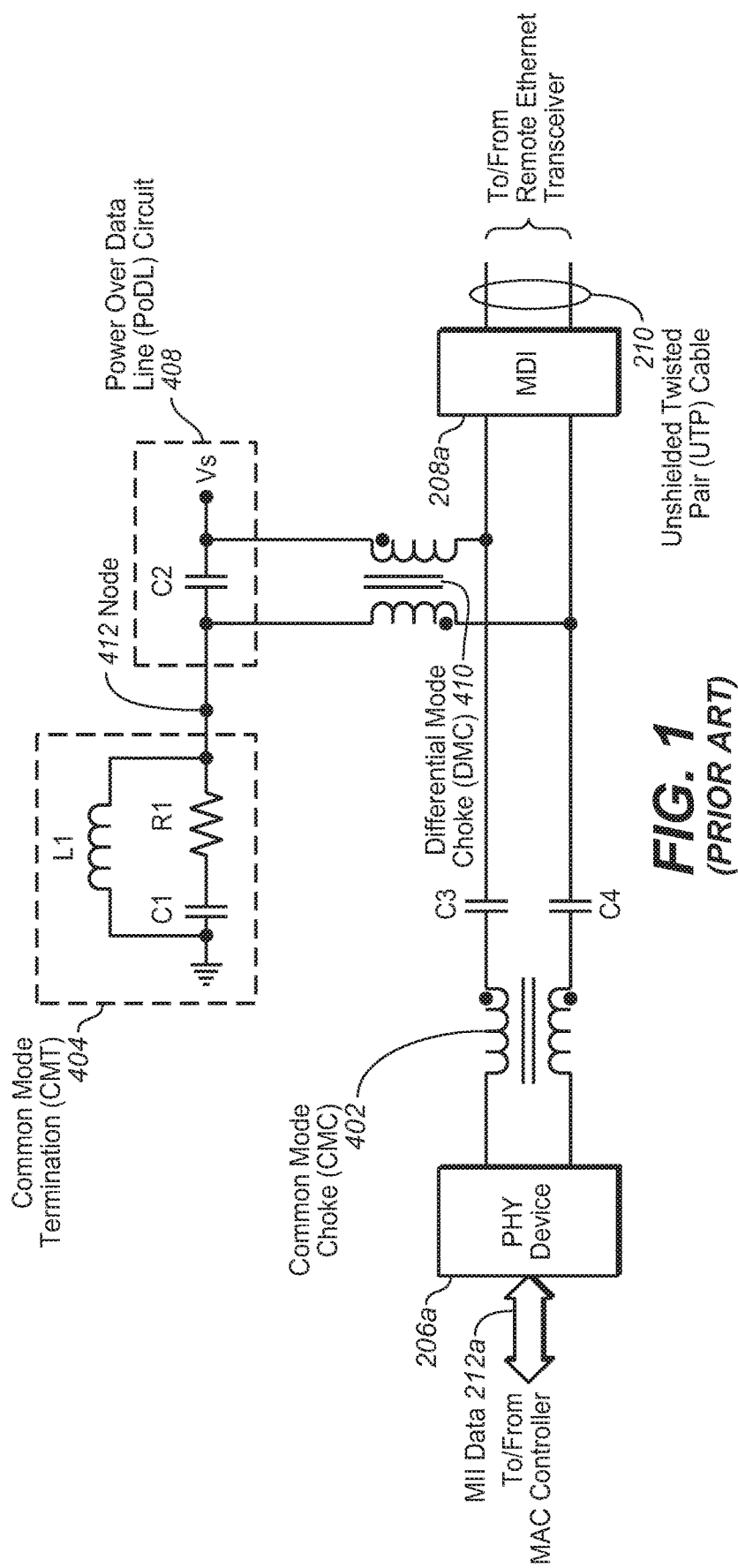
FIG. 1 is a figure from U.S. Pat. No. 10,205,539.
Figure 2:
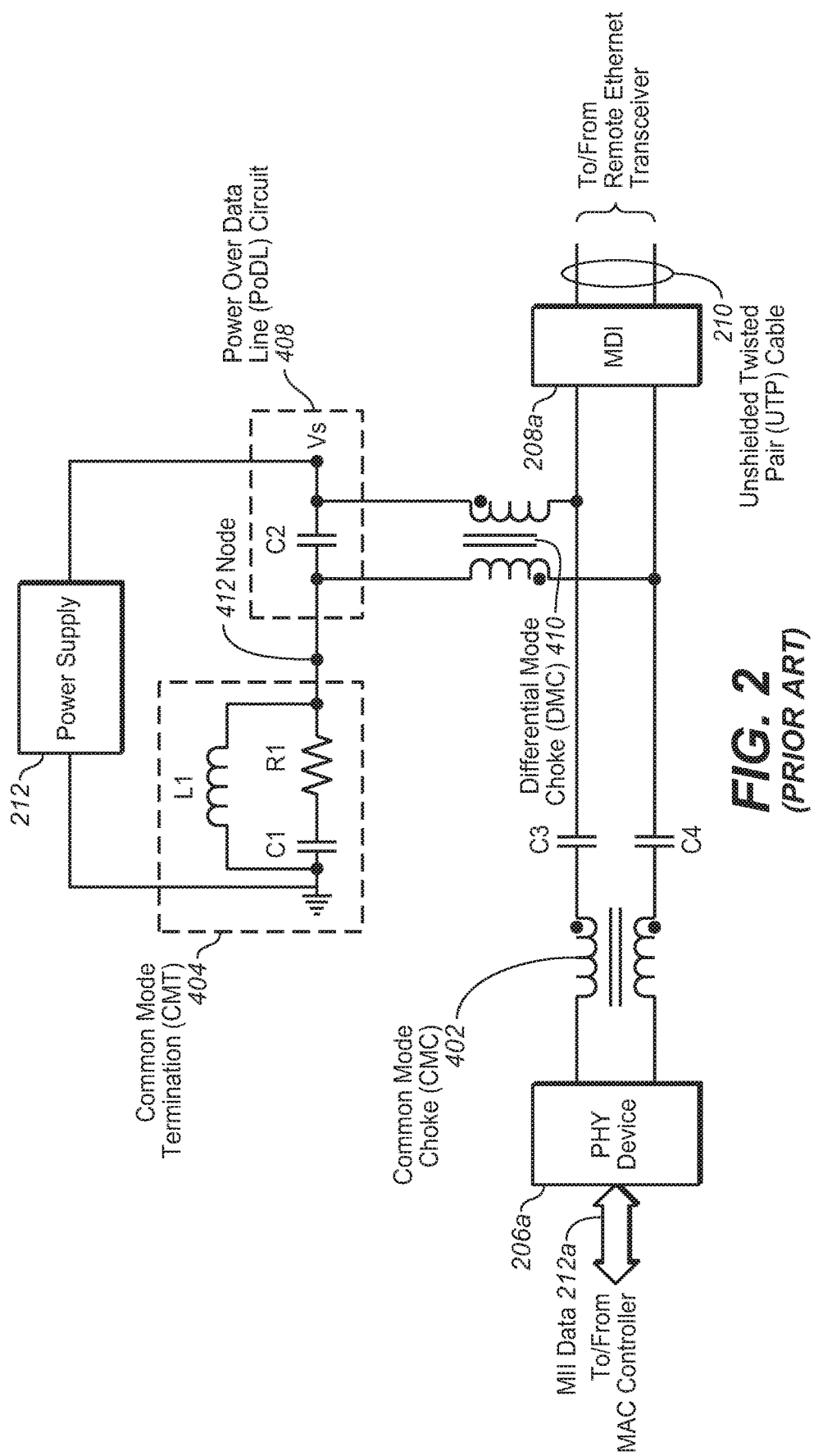
FIG. 2 is the same as FIG. 1 but showing the connection of a power supply to the PoDL circuit.
Figure 3:
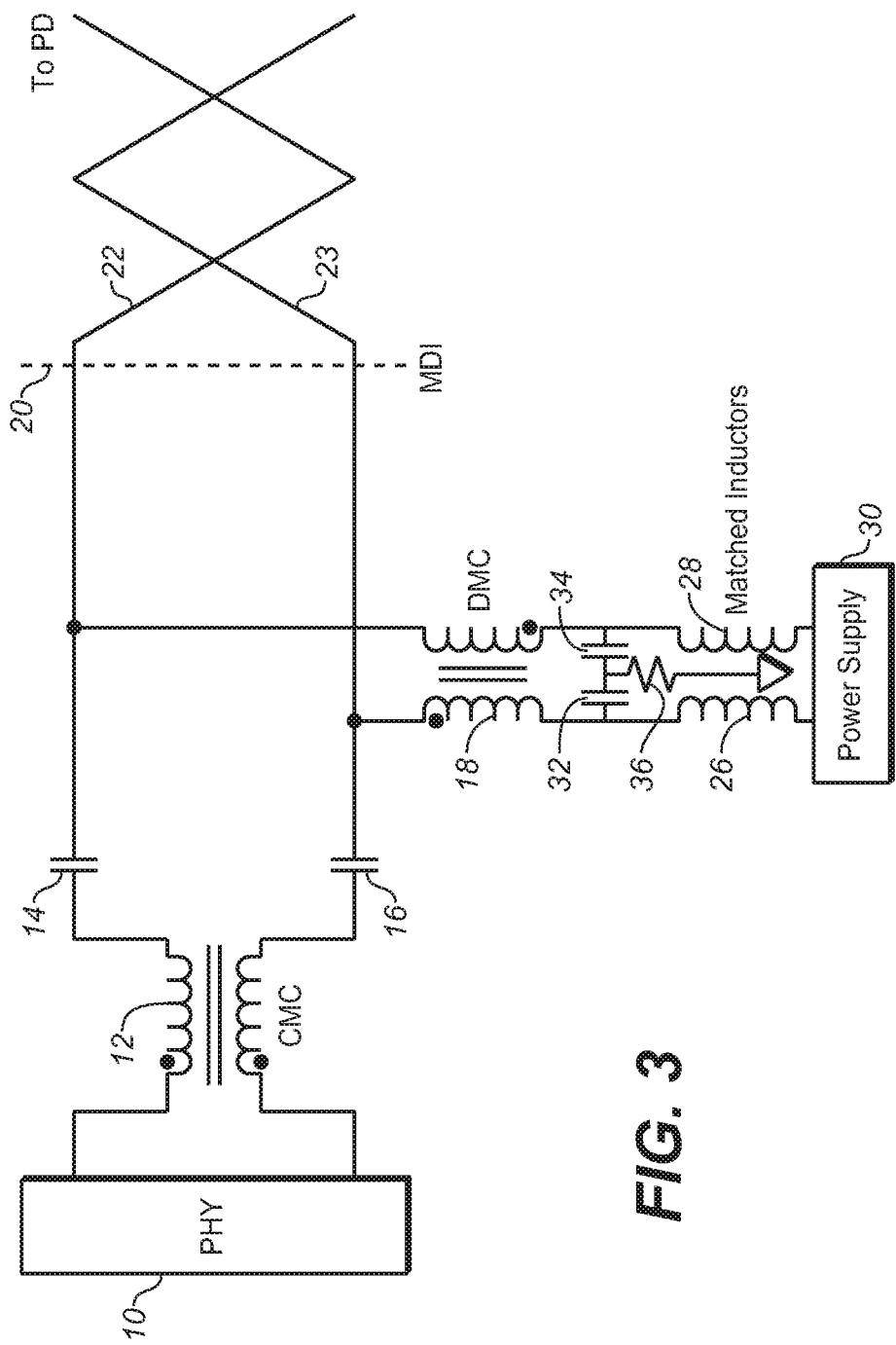
FIG. 3 illustrates one embodiment of the invention, which is a modification of FIG. 1, to create symmetric termination circuitry to prevent common mode to differential mode conversion, while providing DC coupling to the wire pair and common mode noise attenuation.

FIG. 3 illustrates one embodiment of the invention. The PHY 10, CMC 12, AC coupling capacitors 14/16, DMC 18, MDI 20, and wires 22/23 may be the same as their counterparts in FIG. 1 and perform the same functions. The wires 22/23 are coupled to respective terminals of the MDI 20. The wires 22/23 are connected to a powered device (PD).

Coupled to the DMC 18 is a pair of inductors 26 and 28, which are preferably matched.

The other ends of the pair of inductors 26 and 28 are coupled to the outputs of a DC power supply 30. The ground and positive voltage may be provided on either output if the PD connected to the other ends of the wires 22/23 includes polarity correction circuitry.

The pair of inductors 26 and 28 increase the impedance for high frequency signals while providing a very low impedance to the DC voltage. The inductors may be matched to minimize mode conversion. This high impedance to common mode and differential mode signals results in the low output impedance of the power supply 30 having substantially no effect on the common mode termination impedance.

Each wire 22/23 is separately coupled to its own capacitor 32 or 34 for conducting common mode noise. The capacitors 32/34 may be matched and are coupled to a single resistor 36, connected to ground, so that there is no need to match resistors to prevent any imbalance since imbalances lead to mode conversion. The resistor 36 has a resistance that matches the common mode impedance of the twisted wire pair. The RC circuit is referred to as a common mode termination (CMT). The capacitors 32/34 may be connected to separate matched resistors but this may increase the likelihood of imbalanced terminations, due to resistor tolerances, etc.

Accordingly, there is a low impedance DC path between the power supply 30 and the wires 22/23, while the common mode noise signals pass through the DMC 18 and are absorbed by the termination circuitry comprising the capacitors 22/23 and the resistor 36. The DMC 18 windings are matched. The termination impedance is substantially matched to the impedance of the wires 22/23.

The termination circuitry and DC coupling circuitry are symmetric so there is no systematic imbalance which can cause mode conversion.

Another advantage of the PoDL circuit of FIG. 3 is that the common mode termination impedance is independent of the differential mode impedance of the PHY 10 termination. This is especially important in systems where the common mode impedance is not substantially greater than the differential mode impedance. For instance, when using an unshielded twisted pair of wires, the differential mode impedance requirement may be fixed by the PHY's termination, but the common mode impedance may vary depending on factors such as the proximity of a ground plane.

Figure 4:
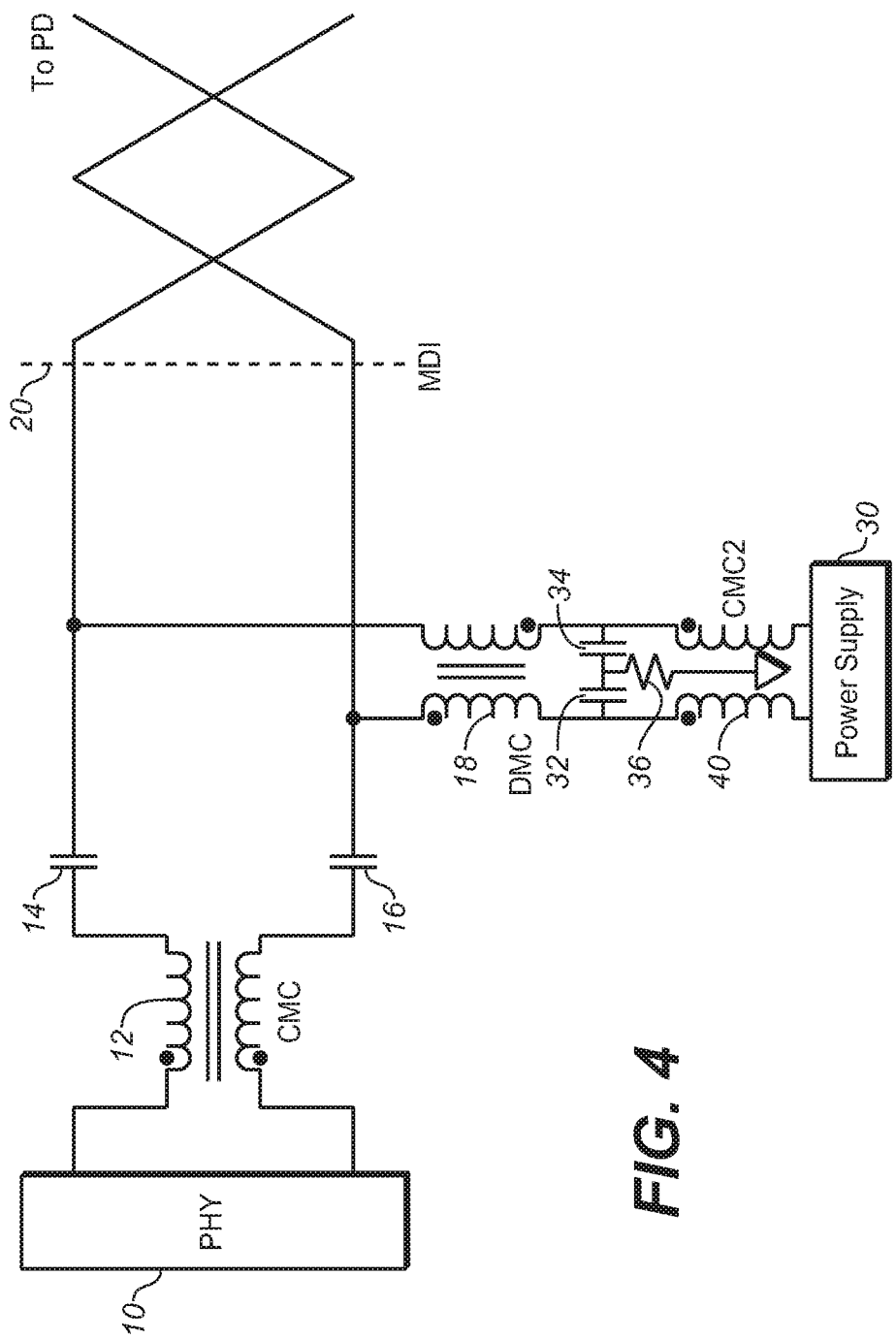
FIG. 4 is similar to FIG. 3 but the pair of inductors in FIG. 3 are replaced with a second CMC (including matched inductors).

FIG. 4 is similar to FIG. 3 but the pair of inductors have been replaced by a second CMC 40 having two matched windings (inductors) sharing the same magnetic core. The CMC 40 provides a high impedance to common mode noise and passes the DC voltage and current from the power supply 30.

The termination and DC coupling schemes of FIGS. 3 and 4 are also suitable for PoDL circuits where the AC coupling capacitors 14/16 are on the PHY side of the CMC 12.

The AC coupling capacitors may be replaced with an isolation transformer.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Data Lines (PoDL) system comprising:
   a physical layer device (PHY) configured to send and receive differential data signals over a pair of wires via a Media Dependent Interface (MDI);
   a first common mode choke (CMC) coupled between an input/output port of the PHY and the MDI, the first CMC configured to provide a low impedance to the differential data signals and a high impedance to common mode noise;
   a differential mode choke (DMC) coupled between the MDI and the CMC, the DMC configured to provide a low impedance for the common mode noise and a high impedance for the differential data signals, the DMC having a first winding and a second winding;

a pair of inductors coupled to the DMC, the pair of inductors comprising a first inductor and a second inductor;

a DC power supply having output terminals coupled to the pair of inductors; and a common mode termination (CMT) configured to provide a substantially matched termination for the common mode noise, wherein the CMT comprises:

a first capacitor coupled to a first node between the first winding of the DMC and the first inductor;

a second capacitor coupled to a second node between the second winding of the DMC and the second inductor; and a resistance coupled between the first capacitor and ground and between the second capacitor and ground.

2. The system of claim 1 wherein the resistance comprises a resistor commonly coupled to the first capacitor and the second capacitor.

3. The system of claim 1 wherein the pair of inductors comprises separate matched inductors not sharing a common magnetic core.

4. The system of claim 1 wherein the pair of inductors comprise a second CMC.

5. The system of claim 1 further comprising a twisted wire pair coupled to the MDI.

6. The system of claim 1 wherein the power supply has a low output impedance.

7. The system of claim 1 further comprising a first AC coupling capacitor coupled in series between the PHY and a first terminal of the MDI, and a second AC coupling capacitor coupled in series between the PHY and a second terminal of the MDI.

8. The system of claim 7 wherein the first capacitor and the second capacitor are coupled between the first CMC and the MDI.

9. The system of claim 1 wherein the differential data signals are Ethernet differential data signals.

10. The system of claim 1 wherein the first capacitor and second capacitor are matched.

11. A method performed by a Power over Data Lines (PoDL) system connected to a first wire and a second wire of a wire pair comprising:

transmitting differential data over the first wire and the second wire and receiving differential data from the first wire and the second wire by a transceiver having a first terminal and a second terminal;

blocking DC voltages from being applied to the first terminal and the second terminal;

conducting the differential data through a first common mode choke (CMC) coupled in series between the transceiver and the first wire, and coupled in series between the transceiver and the second wire, the CMC providing a low impedance to the differential data and a high impedance to common mode noise;

supplying DC power to the wire pair by a power supply coupled to the wire pair via a differential mode choke (DMC) in series with a pair of inductors, such that DC power and differential data are transmitted over the first wire and the second wire; and terminating the first wire and the second wire with termination circuitry to reduce reflections, the termination circuitry comprising:

a first capacitor coupled to a first node between a first winding of the DMC and a first inductor of the pair of inductors;

a second capacitor coupled to a second node between a second winding of the DMC and a second inductor of the pair of inductors; and a resistance coupled between the first capacitor and ground and between the second capacitor and ground.

12. The method of claim 11 wherein the resistance comprises a resistor commonly coupled to the first capacitor and the second capacitor.

13. The method of claim 11 wherein the pair of inductors comprises separate matched inductors not sharing a common magnetic core.

14. The method of claim 11 wherein the pair of inductors comprises a second CMC.

15. The method of claim 11 wherein the wire pair comprises an unshielded twisted wire pair coupled to the MDI.

16. The method of claim 11 wherein the power supply has a low output impedance.

17. The method of claim 11 wherein the step of blocking DC voltages from being applied to the first terminal and the second terminal comprises blocking the DC voltages by a first AC coupling capacitor coupled in series between the PHY and the first wire, and blocking the DC voltages by a second AC coupling capacitor coupled in series between the PHY and the second wire.

18. The method of claim 17 wherein the first capacitor and the second capacitor are coupled between the first CMC and the wire pair.

19. The method of claim 17 wherein the differential data signals are Ethernet differential data signals.

20. The method of claim 17 wherein the transceiver comprises a physical layer device (PHY).

* * * * *